(12) United States Patent
Tokuda et al.

(10) Patent No.: US 11,181,431 B2
(45) Date of Patent: Nov. 23, 2021

(54) PRESSURE SENSOR CHIP

(71) Applicant: AZBIL CORPORATION, Chiyoda-ku (JP)

(72) Inventors: Tomohisa Tokuda, Chiyoda-ku (JP); Hirofumi Tojo, Chiyoda-ku (JP); Nozomi Kida, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 180 days.

(21) Appl. No.: 16/519,060

(22) Filed: Jul. 23, 2019

(65) Prior Publication Data
US 2020/0033219 A1 Jan. 30, 2020

(30) Foreign Application Priority Data

Jul. 24, 2018 (JP) .............................. JP2018-138741

(51) Int. Cl.
| | | |
|---|---|---|
| *G01L 19/06* | (2006.01) | |
| *G01L 13/00* | (2006.01) | |
| *G01L 19/16* | (2006.01) | |
| *G01L 9/00* | (2006.01) | |
| *G01L 27/00* | (2006.01) | |
| *G01L 13/02* | (2006.01) | |
| *G01L 19/00* | (2006.01) | |

(52) U.S. Cl.
CPC .......... *G01L 27/005* (2013.01); *G01L 9/0048* (2013.01); *G01L 13/025* (2013.01); *G01L 19/0092* (2013.01); *G01L 19/0618* (2013.01)

(58) Field of Classification Search
CPC ... G01L 19/0618; G01L 19/06; G01L 19/147; G01L 19/0627; G01L 9/0042; G01L 9/0048; G01L 9/0045; G01L 9/0054; G01L 9/0055; G01L 13/025; G01L 7/08; G01L 7/082

See application file for complete search history.

(56) References Cited

U.S. PATENT DOCUMENTS

| | | | | |
|---|---|---|---|---|
| 4,501,051 A | * | 2/1985 | Bell | ........................ G01L 9/0075 29/25.41 |
| 7,360,431 B2 | | 4/2008 | Yoneda et al. | |
| 2014/0137652 A1 | * | 5/2014 | Tokuda | ................. G01L 13/026 73/715 |
| 2017/0284879 A1 | * | 10/2017 | Takeuchi | ............... G01L 9/0054 |

FOREIGN PATENT DOCUMENTS

| | | |
|---|---|---|
| JP | 3847281 | 9/2006 |
| JP | 2017-106812 | 6/2017 |

* cited by examiner

*Primary Examiner* — Herbert K Roberts
(74) *Attorney, Agent, or Firm* — Oblon, McClelland, Maier & Neustadt, L.L.P.

(57) ABSTRACT

A curved recess in a stopper includes a groove-pattern region and a groove-free region. When a sensor diaphragm reaches a bottom of the curved recess in the stopper, a groove-free region is divided into a ring-shaped first region with which a sensor diaphragm is in close contact and a ring-shaped second region disposed between an inner wall surface of a ring-shaped wall and the ring-shaped first region. The first region serves as a sealing region and the second region serves as a confinement region so that a pressure transmitting medium that remains in a space adjacent to the inner wall surface of the ring-shaped wall is confined in the confinement region, and abnormal deformation of the sensor diaphragm is prevented.

7 Claims, 6 Drawing Sheets

PRESSURE SENSOR CHIP

CROSS-REFERENCE TO RELATED APPLICATIONS

The present application is based on and claims priority to Japanese Application No. 2018-138741, filed Jul. 24, 2018, the entire contents of which are incorporated herein by reference.

Background Disclosure

1. Field Disclosure

The present disclosure relates to a pressure sensor chip including a sensor diaphragm that outputs a signal corresponding to the difference between pressures applied to one and the other surfaces of the sensor diaphragm, for example, a pressure sensor chip that includes a strain resistance gauge provided on a thin-plate-shaped diaphragm that is displaced when a pressure is applied thereto and that detects a pressure applied to the diaphragm based on a change in the resistance of the strain resistance gauge formed on the diaphragm.

2. Description of the Related Art

A pressure difference sensor including a pressure sensor chip has been used as an industrial pressure difference sensor. The pressure sensor chip includes a sensor diaphragm that outputs a signal corresponding to the difference between pressures applied to one and the other surfaces of the sensor diaphragm.

The pressure difference sensor is configured such that fluid pressures applied to a pressure-receiving diaphragm at a high-pressure side and a low-pressure-side are guided to one and the other surfaces of the sensor diaphragm by a pressure transmitting medium (incompressible liquid (sealed liquid)), such as silicone oil. The strain of the sensor diaphragm is detected as, for example, a change in the resistance of the strain resistance gauge. The change in the resistance is converted into an electric signal, which is transmitted to the outside.

FIG. 7 illustrates the structure of a main portion of a pressure sensor chip included in a pressure difference sensor (see, for example, Japanese Patent No. 3847281). This pressure sensor chip 1 includes a sensor diaphragm 1-1, a first holder 1-2, and a second holder 1-3.

The first holder 1-2 and the second holder 1-3 of this pressure sensor chip 1 are joined together with the sensor diaphragm 1-1 provided therebetween. The sensor diaphragm 1-1 is made of silicon, and a strain resistance gauge (not shown) is formed on a surface of the diaphragm, which is thin-plate-shaped. The holders 1-2 and 1-3 are also made of silicon.

The holder 1-2 of this pressure sensor chip 1 has a recess 1-2a, and the holder 1-2 is joined to one surface 1-1a of the sensor diaphragm 1-1 such that a peripheral portion 1-2b of the recess 1-2a faces the one surface 1-1a of the sensor diaphragm 1-1. The holder 1-3 has a recess 1-3a, and the holder 1-3 is joined to another surface 1-1b of the sensor diaphragm 1-1 such that a peripheral portion 1-3b of the recess 1-3a faces the other surface 1-1b of the sensor diaphragm 1-1.

The recess 1-2a in the holder 1-2 has a curved surface (aspherical surface) that extends along a curve to which the sensor diaphragm 1-1 is displaced, and a pressure-guiding hole (pressure guide hole) 1-2c is formed at the apex thereof. The recess 1-3a in the holder 1-3 has a flat surface, and a pressure-guiding hole (pressure guide hole) 1-3c is formed at the bottom thereof.

The pressure sensor chip 1 is configured such that a fluid pressure PL is applied to the one surface 1-1a of the sensor diaphragm 1-1 by a pressure transmitting medium, such as silicone oil, through the pressure guide hole 1-2c in the holder 1-2. Also, a fluid pressure PH is applied to the other surface 1-1b of the sensor diaphragm 1-1 by a pressure transmitting medium, such as silicone oil, through the pressure guide hole 1-3c in the holder 1-3.

In this pressure sensor chip 1, PH denotes a high-pressure-side fluid pressure, and PL denotes a low-pressure-side fluid pressure. The curved recess 1-2a in the first holder 1-2 serves as a stopper when the fluid pressure PH is excessive. More specifically, when the sensor diaphragm 1-1 is displaced in response to an excessive pressure applied to the other surface 1-1b of the sensor diaphragm 1-1, the curved surface of the recess 1-2a in the holder 1-2 receives a displacement surface of the sensor diaphragm 1-1 over the entire region thereof. In the following description, the holder 1-2 is referred to also as a stopper.

Accordingly, excessive displacement of the sensor diaphragm 1-1 can be prevented when an excessive pressure is applied to the other surface 1-1b of the sensor diaphragm 1-1, and stress concentration does not occur at the peripheral portion of the sensor diaphragm 1-1. Thus, unexpected breakage of the sensor diaphragm 1-1 due to application of excessive pressure can be effectively prevented, and the operating pressure (withstanding pressure) applicable to the sensor diaphragm 1-1 with protection from excessive pressure can be increased.

According to the pressure sensor chip 1, when the shape of the curved surface (aspherical surface) of the recess 1-2a in the stopper 1-2 differs from the ideal design shape, there is a risk that the pressure transmitting medium sealed in the inner space will be left between the sensor diaphragm 1-1 and the curved recess 1-2a in the stopper 1-2 after the sensor diaphragm 1-1 has reached the bottom of the stopper 1-2. In this case, since there is no space for receiving the pressure transmitting medium, abnormal deformation of the sensor diaphragm 1-1 may occur. Accordingly, excessive stress is generated and there is a risk that abnormal output or breakage of the sensor diaphragm 1-1 will occur.

When the pressure difference is increased and then reduced after the sensor diaphragm 1-1 has reached the bottom, separation of the sensor diaphragm 1-1 ideally occurs at the pressure difference at which the sensor diaphragm 1-1 has reached the bottom. However, since the pressure receiving area at the bottom side is as small as the opening area of the pressure guide hole 1-2c after the sensor diaphragm 1-1 has reached the bottom, separation may not occur at the pressure at which the sensor diaphragm 1-1 has reached the bottom. Also, separation may not occur even when the pressure is reduced to an operation pressure.

The size of the gap through which the pressure transmitting medium is introduced decreases toward the edge of the sensor diaphragm 1-1. Therefore, the pressure transmitting medium cannot be easily introduced, and there may be a region where the pressure transmitting medium does reach. In such a case, a pressure loss may occur.

Accordingly, to avoid abnormal deformation of the sensor diaphragm 1-1, and to facilitate separation of the sensor diaphragm 1-1 and introduction of the pressure transmitting medium, the following configuration has been proposed. That is, a plurality of projections (columns) 2 (see FIG. 8) are discretely formed on the curved recess 1-2a in the stopper 1-2 so that grooves 3 are formed as passages between the projections 2 (see, for example, Japanese Unexamined Patent Application Publication No. 2017-106812).

However, in the pressure sensor chip 1 having the above-described configuration, the stopper 1-2 and the sensor diaphragm 1-1 form an acute angle at a joining portion therebetween (portion surrounded by the dotted line in FIG. 8). Therefore, stress concentration occurs at one point at which the stopper 1-2 and the sensor diaphragm 1-1 form an acute angle at the joining portion (point where the angle is close to 0), and fracture toughness is very low. Accordingly, even a small deformation of the sensor diaphragm 1-1 in a direction away from the stopper 1-2 due to low pressure (fluid pressure PL) may lead to a fracture.

As illustrated in FIG. 9, a ring-shaped wall 1-5 may be provided on the peripheral portion 1-2b of the stopper 1-2 so that an inner wall surface 1-5a of the ring-shaped wall 1-5 faces a space 1-4 surrounded by the sensor diaphragm 1-1 and the curved recess 1-2a in the stopper 1-2. FIG. 10 shows the stopper 1-2 viewed from below the bottom surface of the ring-shaped wall 1-5.

In this case, a step (very small step) h is formed along the entire circumference of the joining portion between the stopper 1-2 and the sensor diaphragm 1-1 (portion surrounded by the dotted line in FIG. 9), and the step h disperses the stress. More specifically, the step h has a plurality of points at which the stress is dispersed. Accordingly, the fracture toughness of the joining portion between the stopper 1-2 and the sensor diaphragm 1-1 is increased, and sufficient strength can be ensured when the sensor diaphragm 1-1 is displaced in the direction away from the stopper.

However, in the case where the above-described step h is formed, when the shape of the curved recess 1-2a in the stopper 1-2 is shifted and an excessive pressure is applied, the pressure transmitting medium 4 flows into the grooves 3 in the peripheral portion of the curved recess 1-2a in the stopper 1-2 and to the step h after the sensor diaphragm 1-1 has reached the bottom of the stopper 1-2 (see FIG. 11). Therefore, abnormal deformation of the peripheral surface of the sensor diaphragm 1-1 occurs along the aspherical shape of the recess 1-2a, and the withstanding pressure is reduced.

SUMMARY DISCLOSURE

The present disclosure has been made to solve the above-described problems, and an object of the present disclosure is to provide a pressure sensor chip in which a joining portion between a stopper and a sensor diaphragm has an increased fracture toughness, which does not cause a fracture in response to a small deformation of the sensor diaphragm due to low pressure, and with which abnormal deformation of the sensor diaphragm after the sensor diaphragm has reached the bottom of the stopper can be prevented.

To achieve the above-described object, according to the present disclosure, a pressure sensor chip (1) includes a sensor diaphragm (1-1) that outputs a signal corresponding to a pressure difference; a first holder (1-2) including a peripheral portion (1-2b) that faces and is joined to one surface (1-1a) of the sensor diaphragm, the first holder having a first pressure guide hole (1-2c) through which a first measurement pressure (PL) is guided to the one surface of the sensor diaphragm; and a second holder (1-3) including a peripheral portion (1-3b) that faces and is joined to another surface (1-1b) of the sensor diaphragm, the second holder having a second pressure guide hole (1-3c) through which a second measurement pressure (PH) is guided to the other surface of the sensor diaphragm. The first holder (1-2) includes a curved recess (1-2a) that prevents excessive displacement of the sensor diaphragm when an excessive pressure is applied to the other surface of the sensor diaphragm, the curved recess extending along a curve to which the sensor diaphragm is displaced. The peripheral portion (1-2b) of the first holder (1-2) includes a ring-shaped wall (1-5) having an inner wall surface (1-5a) that faces a space (1-4) surrounded by the sensor diaphragm and the curved recess in the first holder. The curved recess (1-2a) in the first holder (1-2) includes a groove-pattern region (#1) in which grooves (3) that communicate with the first pressure guide hole are formed as passages between a plurality of projections (2) and a ring-shaped groove-free region (#2) that surrounds the groove-pattern region. When the sensor diaphragm reaches a bottom of the curved recess in the first holder, the groove-free region (#2) is divided into a ring-shaped first region (#21) with which the sensor diaphragm is in close contact and a ring-shaped second region (#22) disposed between the inner wall surface of the ring-shaped wall and the ring-shaped first region. The ring-shaped first region serves as a sealing region and the ring-shaped second region serves as a confinement region (#22) so that a pressure transmitting medium (4) that remains in a space (5) adjacent to the inner wall surface of the ring-shaped wall is confined in the confinement region.

According to the present disclosure, the ring-shaped wall is provided on the peripheral portion of the first holder (stopper) so that the inner wall surface of the ring-shaped wall faces the space surrounded by the sensor diaphragm and the curved recess in the first holder and that a step (very small step) is formed along the entire circumference of the joining portion between the stopper and the sensor diaphragm. According to the present disclosure, the step disperses the stress applied to the joining portion between the stopper and the sensor diaphragm. More specifically, the step has a plurality of points at which the stress is dispersed. Accordingly, the fracture toughness of the joining portion between the stopper and the sensor diaphragm is increased, and sufficient strength can be ensured when the sensor diaphragm is displaced in the direction away from the stopper.

According to the present disclosure, the curved recess in the first holder (stopper) includes the groove-pattern region in which the grooves are formed as passages between the projections and the ring-shaped groove-free region that surrounds the groove-pattern region. When the sensor diaphragm reaches the bottom of the curved recess in the stopper, the ring-shaped groove-free region is divided into the ring-shaped first region with which the sensor diaphragm is in close contact and the ring-shaped second region disposed between the inner wall surface of the ring-shaped wall and the ring-shaped first region. Accordingly, the ring-shaped first region serves as the sealing region and the ring-shaped second region serves as the confinement region so that a pressure transmitting medium that remains in a space adjacent to the inner wall surface of the ring-shaped wall is confined in the confinement region. In this case, the amount of pressure transmitting medium that is confined is small, and the sensor diaphragm is deformed only by an amount corresponding to the amount by which the confined pressure transmitting medium is compressed.

In the above description, reference signs in brackets denote components drawn in the figures corresponding to the components of the disclosure.

As described above, according to the present disclosure, the ring-shaped wall is provided on the peripheral portion of the first holder (stopper). Thus, a step (very small step) is formed along the entire circumference of the joining portion between the stopper and the sensor diaphragm, and the step disperses the stress applied to the joining portion between the stopper and the sensor diaphragm. Accordingly, the fracture toughness of the joining portion between the stopper and the sensor diaphragm is increased, and sufficient strength can be ensured when the sensor diaphragm is displaced in the direction away from the stopper. As a result, the risk of fracture as a result of small deformation of the sensor diaphragm due to low pressure can be eliminated.

According to the present disclosure, the curved recess in the first holder (stopper) includes the groove-pattern region in which the grooves that communicate with the first pressure guide hole are formed as passages between the projections and the ring-shaped groove-free region that surrounds the groove-pattern region. When the sensor diaphragm reaches the bottom of the curved recess in the stopper, the ring-shaped groove-free region is divided into the ring-shaped first region with which the sensor diaphragm is in close contact and the ring-shaped second region disposed between the inner wall surface of the ring-shaped wall and the ring-shaped first region. Accordingly, the ring-shaped first region serves as the sealing region and the ring-shaped second region serves as the confinement region so that a pressure transmitting medium that remains in a space adjacent to the inner wall surface of the ring-shaped wall is confined in the confinement region. Therefore, the sensor diaphragm can be deformed only by an amount corresponding to the amount by which the pressure transmitting medium is compressed. As a result, abnormal deformation of the sensor diaphragm after the sensor diaphragm has reached the bottom of the stopper can be prevented.

DETAILED DESCRIPTION

An embodiment of the present disclosure will be described in detail with reference to the drawings.

Figure 1:
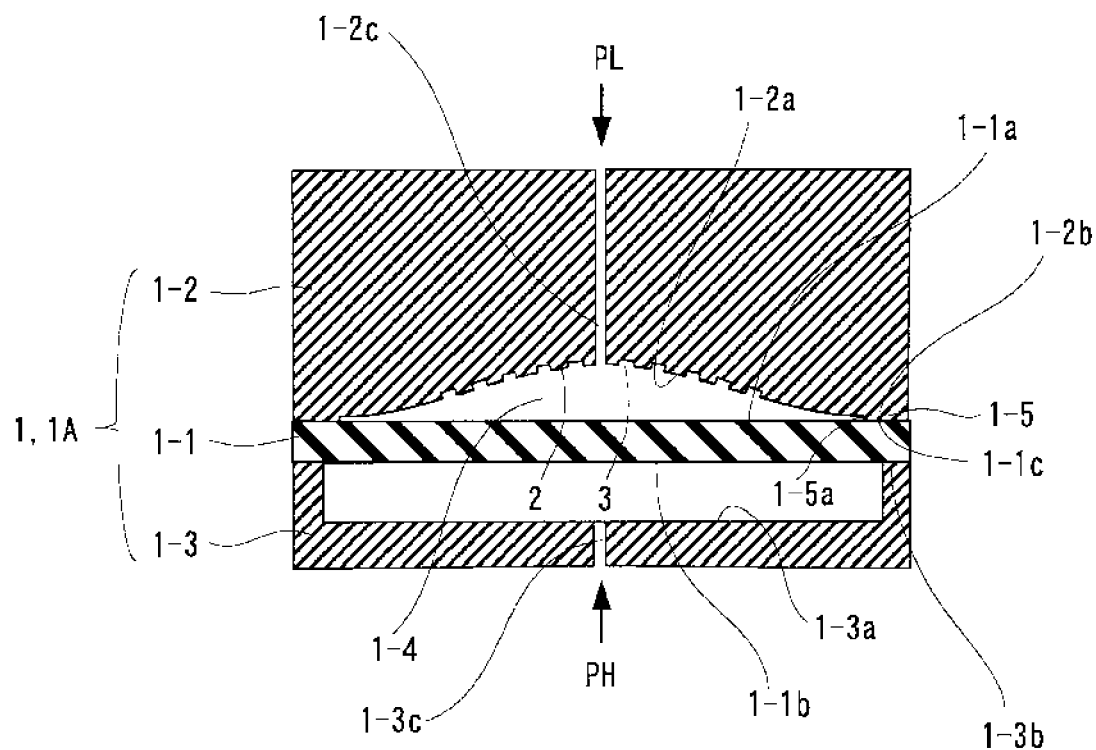
FIG. 1 is a schematic diagram illustrating a pressure sensor chip according to an embodiment of the present disclosure.
Figure 7:
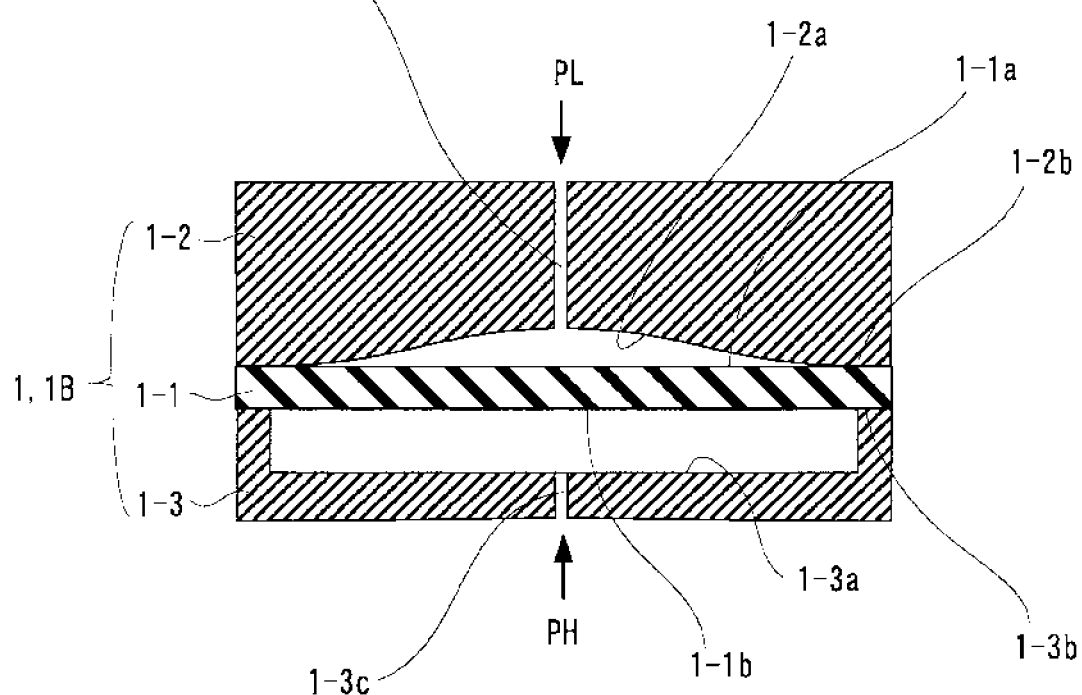
FIG. 7 illustrates the structure of a main portion of a pressure sensor chip according to the related art.
Figure 8:
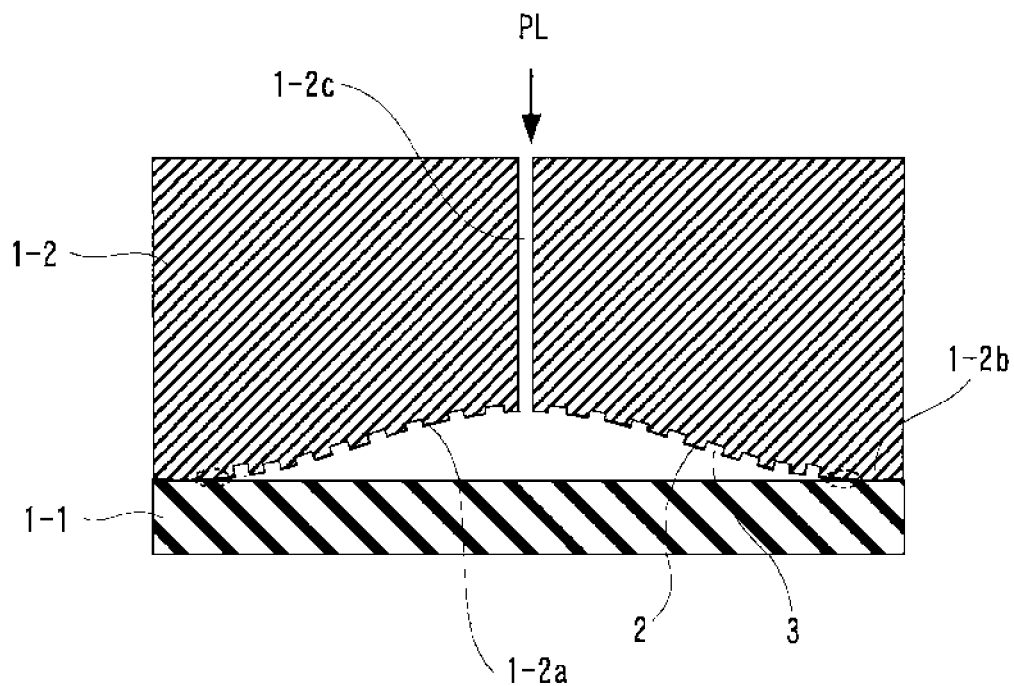
FIG. 8 illustrates an example in which a plurality of projections are provided on a curved recess of a stopper included in the pressure sensor chip so that grooves are formed between the projections.
Figure 9:
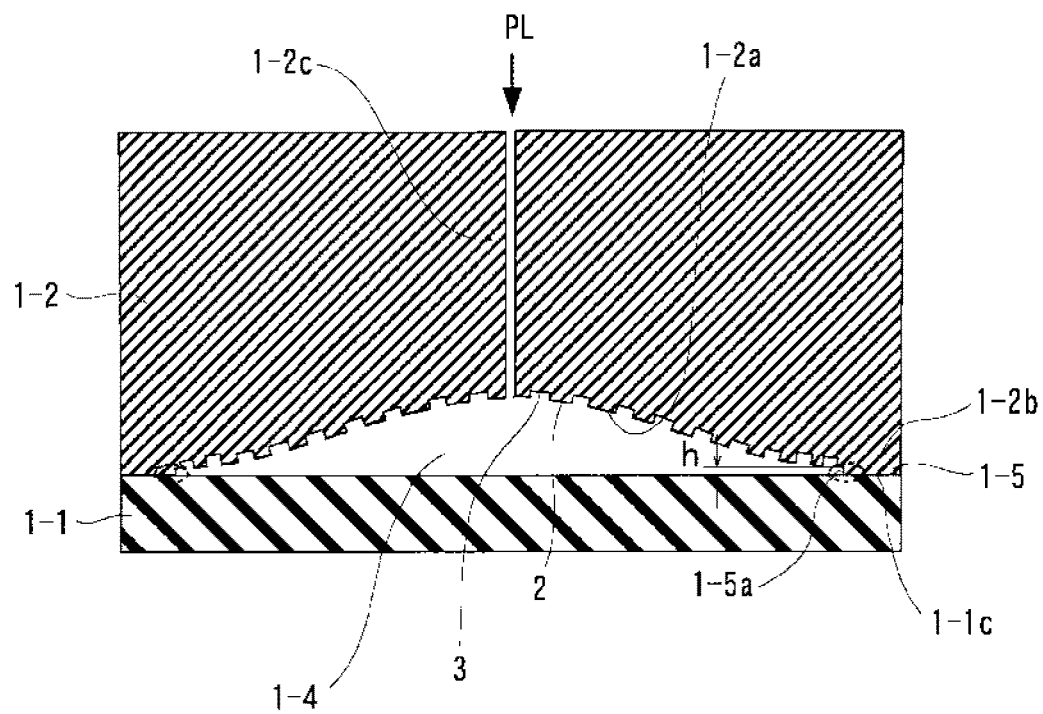
FIG. 9 illustrates an example in which a ring-shaped wall is provided on the peripheral portion of the stopper in the example illustrated in FIG. 8.
Figure 10:
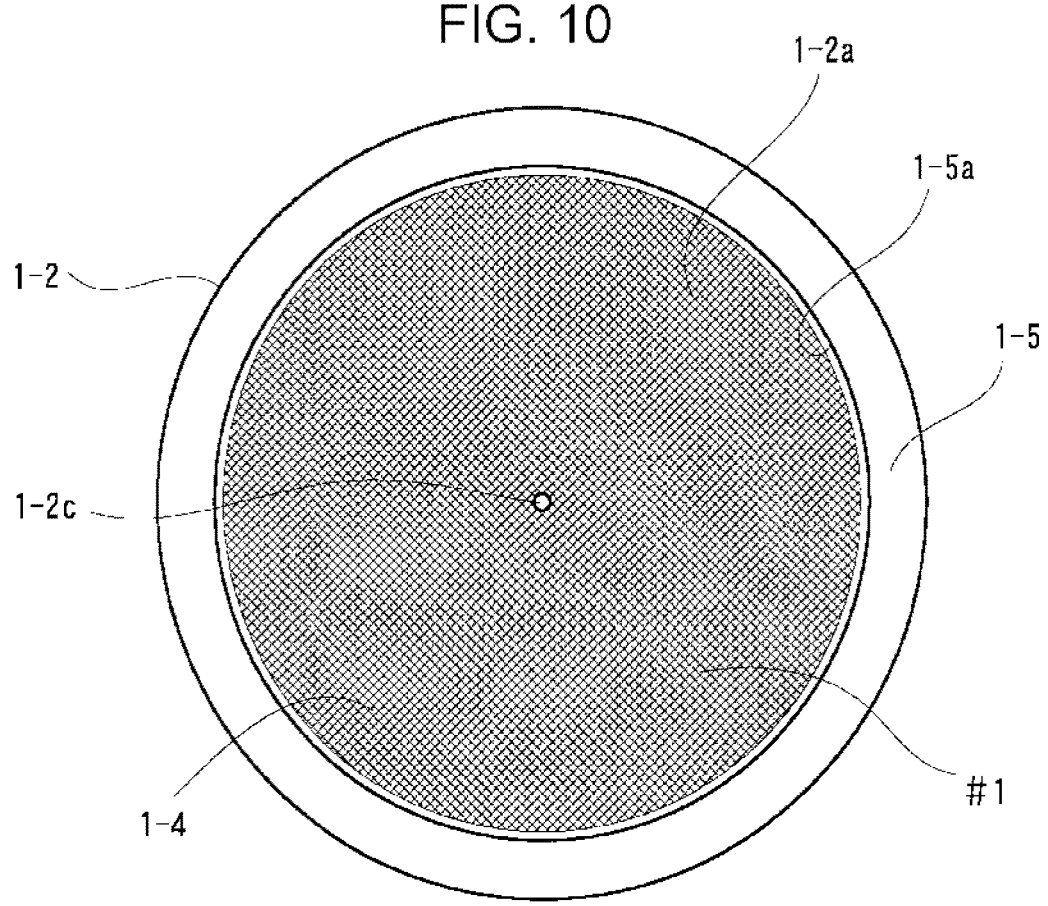
FIG. 10 illustrates the stopper in the example illustrated in FIG. 9 viewed from below the bottom surface of the ring-shaped wall.
Figure 11:
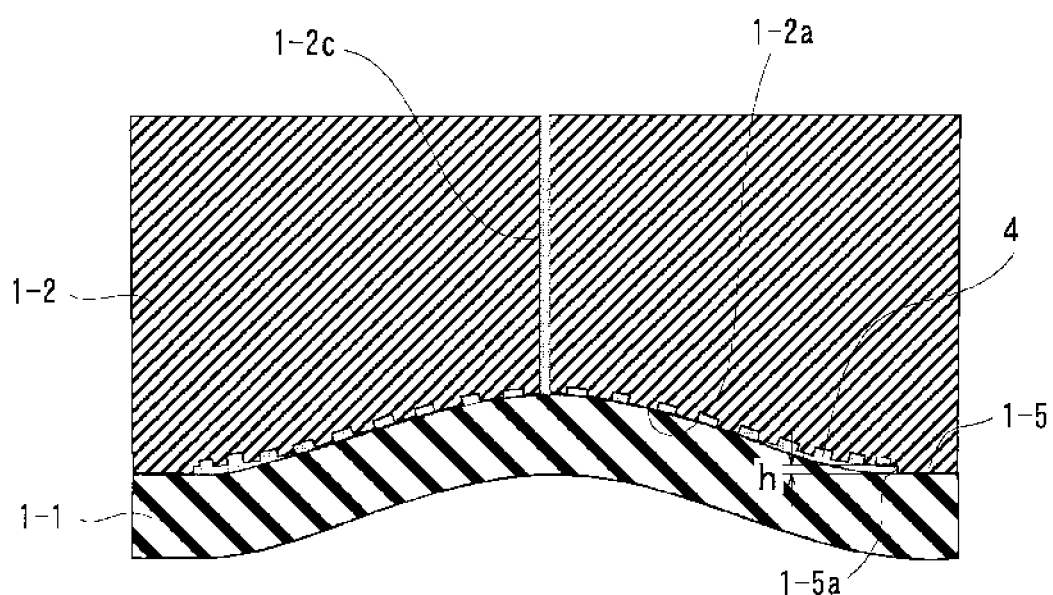
FIG. 11 illustrates the manner in which a sensor diaphragm has reached the bottom of a curved recess in the stopper in the example illustrated in FIG. 9.

FIG. 1 is a schematic diagram illustrating a pressure sensor chip according to an embodiment of the present disclosure. In FIG. 1, components that are the same as or similar to those illustrated in FIG. 7 are denoted by the same reference numerals as those in FIG. 7, and description thereof is omitted.

In the following description, the pressure sensor chip 1 according to the present embodiment is denoted by 1A for discrimination from the pressure sensor chip 1 according to the related art illustrated in FIG. 7, and the pressure sensor chip 1 according to the related art is denoted by 1B.

Figure 2:
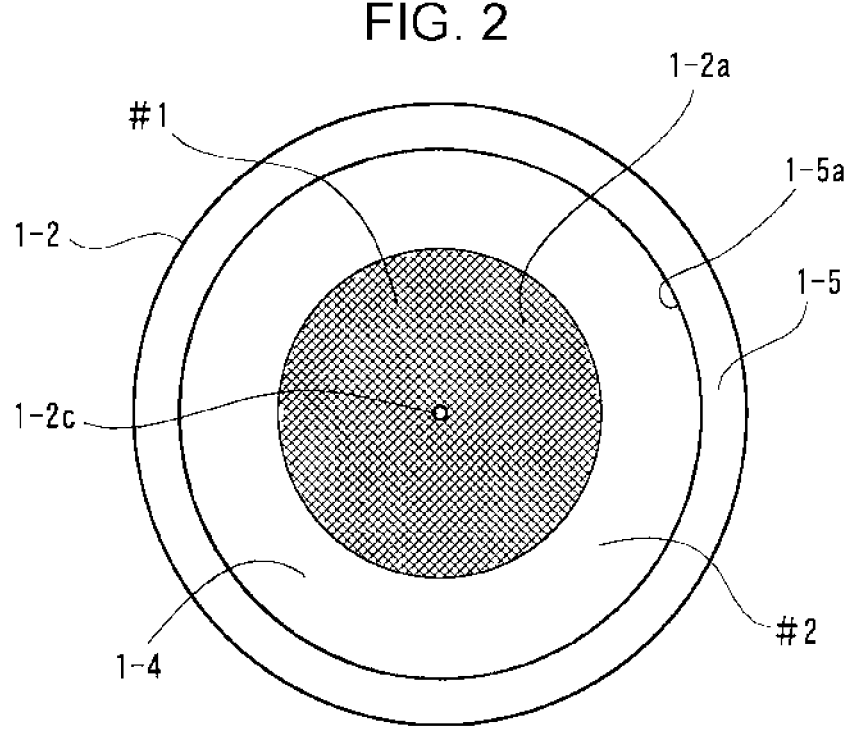
FIG. 2 illustrates a stopper included in the pressure sensor chip viewed from below the bottom surface of a ring-shaped wall.

The pressure sensor chip 1A according to the present embodiment includes a ring-shaped wall 1-5 that is formed integrally with a peripheral portion 1-2b of a stopper 1-2. FIG. 2 illustrates the stopper 1-2 viewed from below the bottom surface of the ring-shaped wall 1-5.

The bottom surface of the ring-shaped wall 1-5 is joined to a peripheral portion 1-1c of a sensor diaphragm 1-1. The ring-shaped wall 1-5 has an inner wall surface 1-5a that faces the space 1-4 surrounded by the sensor diaphragm 1-1 and a curved recess 1-2a in the stopper 1-2. The angle θ (see FIG. 3) of the inner wall surface 1-5a of the ring-shaped wall 1-5, that is, the angle θ with respect to a joining surface S between the ring-shaped wall 1-5 and the peripheral portion 1-1c of the sensor diaphragm 1-1, is 90°.

The pressure sensor chip 1A according to the present embodiment is configured such that the curved recess 1-2a in the stopper 1-2 includes a groove-pattern region #1 in which grooves 3 are formed as passages between projections 2 and a ring-shaped groove-free region #2 that surrounds the groove-pattern region #1. More specifically, the grooves 3 are formed in the curved recess 1-2a in the stopper 1-2 in the groove-pattern region #1, but are not formed in a certain region #2 between the groove-pattern region #1 and the inner wall surface 1-5a of the ring-shaped wall 1-5.

Figure 3:
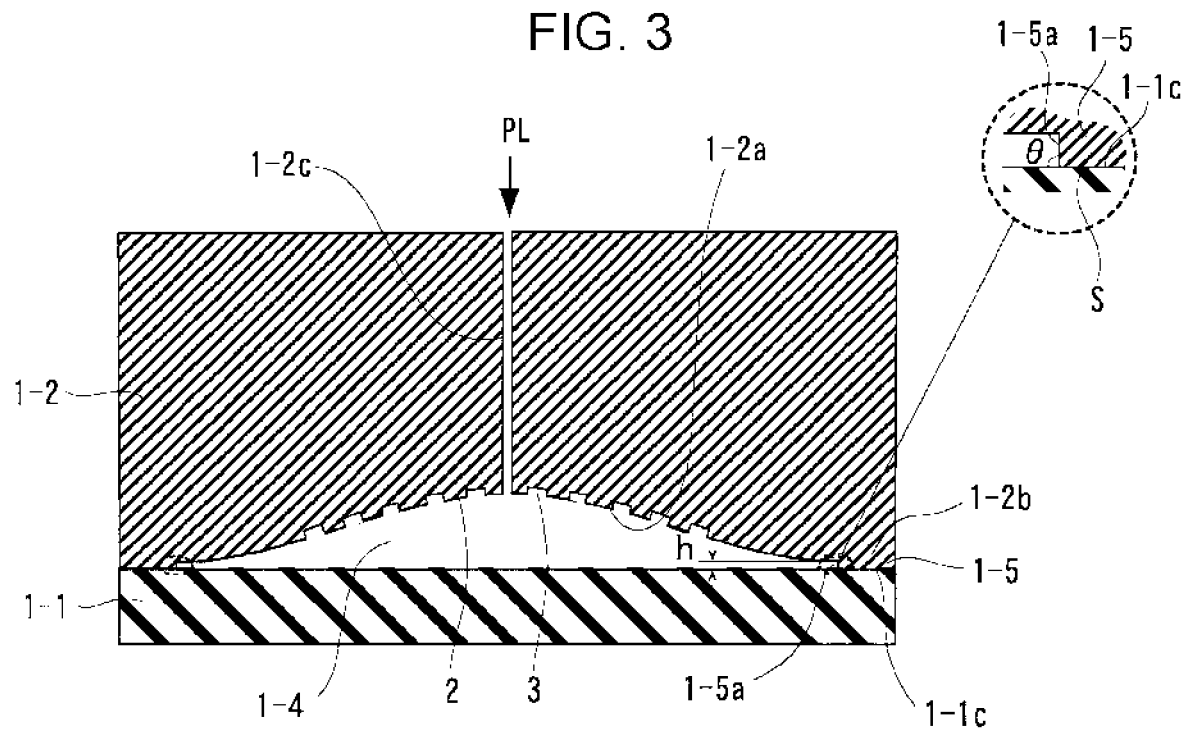
FIG. 3 illustrates a sensor diaphragm and the stopper included in the pressure sensor chip.

The pressure sensor chip 1A according to the present embodiment is configured such that the inner wall surface 1-5a of the ring-shaped wall 1-5 provided on the peripheral portion 1-2b of the stopper 1-2 faces the space 1-4 defined by the sensor diaphragm 1-1 and the curved recess 1-2a in the stopper 1-2, and a step (very small step) h is formed along the entire circumference of the joining portion between the stopper 1-2 and the sensor diaphragm 1-1 (portion surrounded by the dotted line in FIG. 3).

According to the pressure sensor chip 1A of the present embodiment, the step h disperses the stress applied to the joining portion between the stopper 1-2 and the sensor diaphragm 1-1. More specifically, the step h has a plurality of points at which the stress is dispersed. Accordingly, the fracture toughness of the joining portion between the stopper 1-2 and the sensor diaphragm 1-1 is increased, and sufficient strength can be ensured when the sensor diaphragm 1-1 is displaced in the direction away from the stopper. Thus, the risk of fracture as a result of small deformation of the sensor diaphragm 1-1 due to low pressure (fluid pressure PL) can be eliminated.

The pressure sensor chip 1A according to the present embodiment is configured such that the curved recess 1-2a in the stopper 1-2 includes the groove-pattern region #1 in which the grooves 3 are formed as passages between the projections 2 and the ring-shaped groove-free region #2 that surrounds the groove-pattern region #1.

Figure 4:
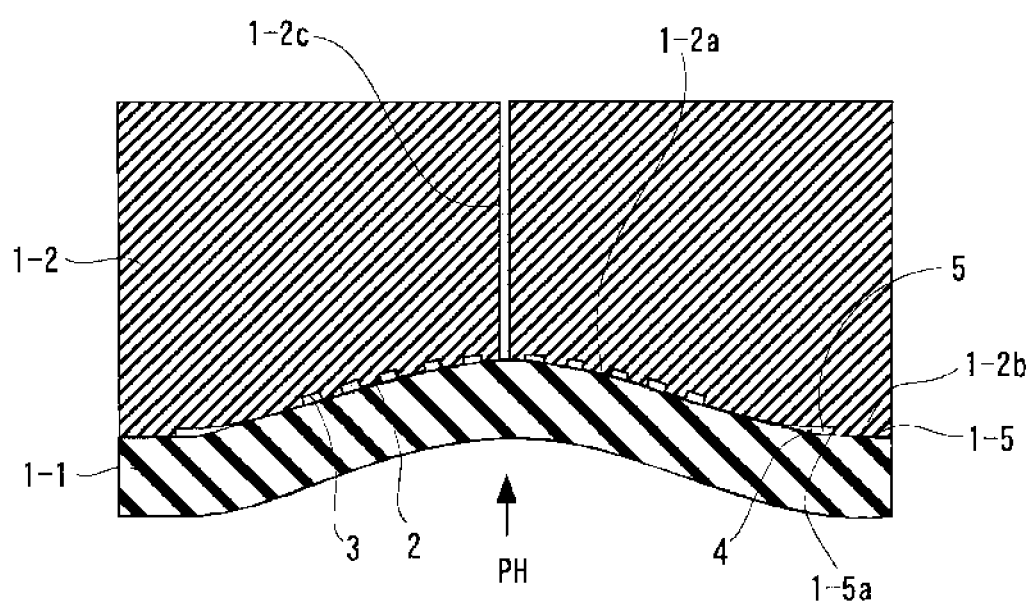
FIG. 4 illustrates the state in which the sensor diaphragm has reached the bottom of a curved recess in the stopper.
Figure 5:
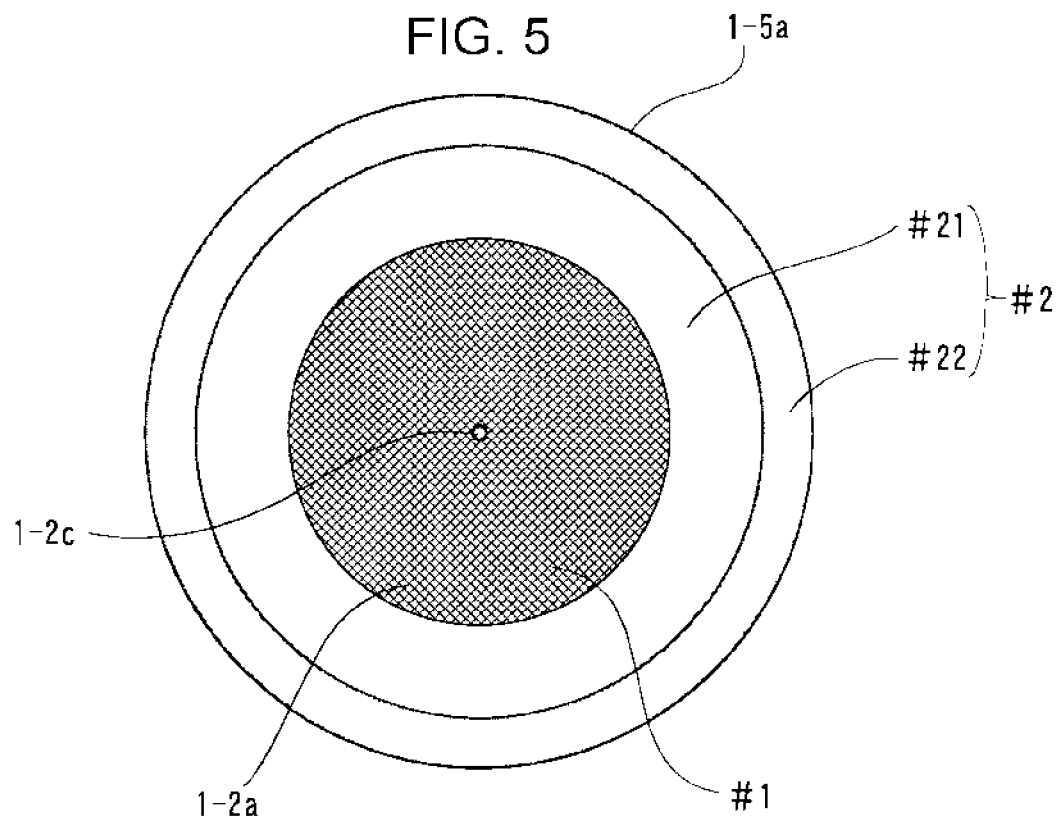
FIG. 5 illustrates the manner in which a ring-shaped groove-free region is divided into a sealing region and a confinement region when the sensor diaphragm has reached the bottom.

When the sensor diaphragm 1-1 reaches the bottom of the curved recess 1-2a in the stopper 1-2 (see FIG. 4), as illustrated in FIG. 5, the ring-shaped groove-free region #2 is divided into a ring-shaped first region #21 in which the sensor diaphragm 1-1 is in close contact with the stopper 1-2 and a ring-shaped second region #22 provided between the inner wall surface 1-5a of the ring-shaped wall 1-5 and the ring-shaped first region #21.

Thus, according to the pressure sensor chip 1A of the present embodiment, when the sensor diaphragm 1-1 reaches the bottom of the curved recess 1-2a in the stopper 1-2, the ring-shaped first region #21 serves as a sealing region, and the ring-shaped second region #22 serves as a confinement region so that the pressure transmitting medium 4 remaining in a space 5 that is adjacent to the inner wall surface 1-5a of the ring-shaped wall 1-5 (space adjacent to the inner wall surface) is confined in the confinement region #22.

The pressure sensor chip 1A according to the present embodiment is configured such that, in a region other than the confinement region #22, the curved recess 1-2a (aspherical surface) of the stopper 1-2 is shaped along a curve to which the sensor diaphragm 1-1 is deformed when the step h is provided. The stopper 1-2 is shaped so that the stress generated after the sensor diaphragm 1-1 has reached the bottom does not exceed the breaking strength until the pressure reaches a desired withstanding pressure.

As described above, the pressure transmitting medium 4 remaining in the space 5 adjacent to the inner wall surface 1-5a of the ring-shaped wall 1-5 is confined in the confinement region #22. However, the amount of pressure transmitting medium 4 confined in the confinement region #22 is small, and the sensor diaphragm 1-1 is deformed only by an amount corresponding to the amount by which the confined pressure transmitting medium 4 is compressed. For example, the amount of deformation is as small as about 10% of the amount of remaining pressure transmitting medium 4. Thus, abnormal deformation of the sensor diaphragm 1-1 after the sensor diaphragm 1-1 has reached the bottom of the stopper 1-2 can be prevented.

In the above-described embodiment, the angle θ of the inner wall surface 1-5a of the ring-shaped wall 1-5 is 90°. However, the angle θ is not limited to 90°, and may instead be, for example, 120°. The angle θ of the inner wall surface 1-5a of the ring-shaped wall 1-5 is preferably greater than or equal to 90°, but may instead be, for example, 45° or 60°.

Figure 6:
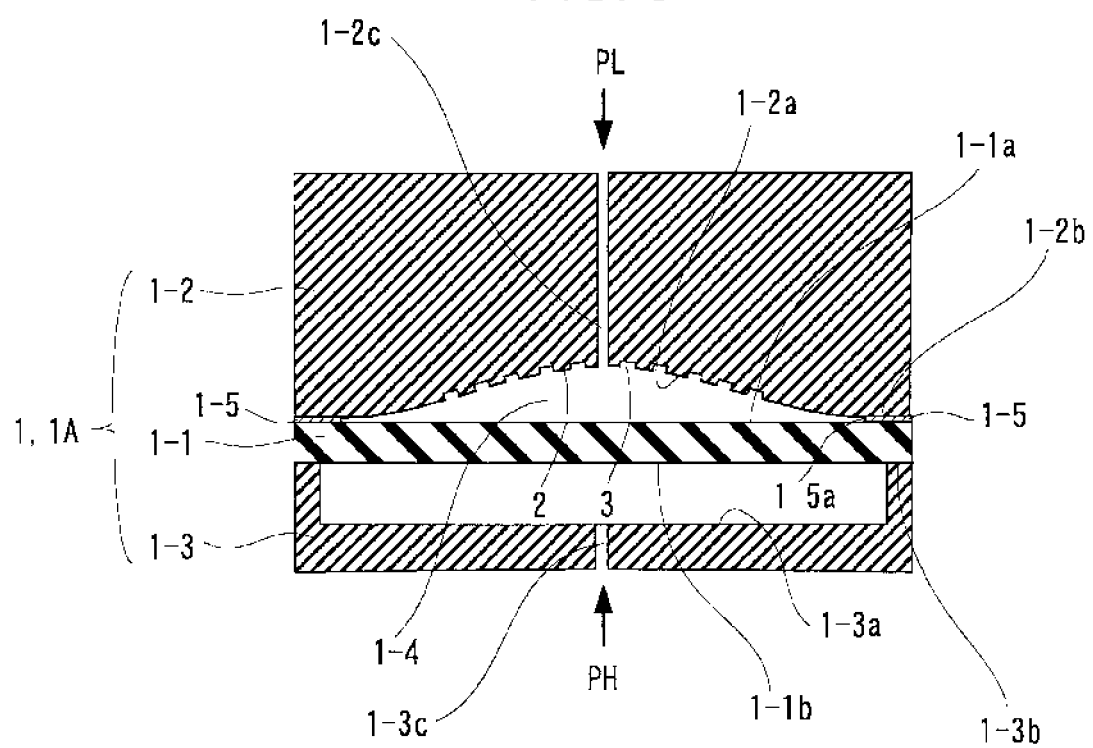
FIG. 6 illustrates an example in which a ring-shaped wall is provided on a peripheral portion of the stopper as a separate component.

In addition, in the above-described embodiment, the ring-shaped wall 1-5 is formed integrally with the peripheral portion 1-2b of the stopper 1-2. However, the ring-shaped wall 1-5 may instead be a separate component that is provided on the peripheral portion 1-2b of the stopper 1-2 (see FIG. 6).

In addition, in the above-described embodiment, the sensor diaphragm 1-1 and the second holder 1-3 are formed as separate components. However, the sensor diaphragm 1-1 and the second holder 1-3 may be integrated with each other. The scope of the present disclosure includes the configuration in which the sensor diaphragm 1-1 and the second holder 1-3 are integrated with each other.

EXPANSION OF EMBODIMENTS

Although an embodiment of the present disclosure has been described, the present disclosure is not limited to the above-described embodiment. The configuration and details of the present disclosure may be modified in various ways understandable by those skilled in the art within the scope of the technical concept of the present disclosure.

What is claimed is:

1. A pressure sensor chip, comprising:
a sensor diaphragm that outputs a signal corresponding to a pressure difference;
a first holder including a peripheral portion that faces and is joined to one surface of the sensor diaphragm, the first holder having a first pressure guide hole through which a first measurement pressure is guided to the one surface of the sensor diaphragm; and
a second holder including a peripheral portion that faces and is joined to another surface of the sensor diaphragm, the second holder having a second pressure guide hole through which a second measurement pressure is guided to the other surface of the sensor diaphragm,
wherein the first holder includes
a curved recess that prevents excessive displacement of the sensor diaphragm when an excessive pressure is applied to the other surface of the sensor diaphragm, the curved recess extending along a curve to which the sensor diaphragm is displaced,
wherein the peripheral portion of the first holder includes
a ring-shaped wall having an inner wall surface that faces a space surrounded by the sensor diaphragm and the curved recess in the first holder,
wherein the curved recess in the first holder includes
a groove-pattern region in which grooves that communicate with the first pressure guide hole are formed as passages between a plurality of projections, and
a ring-shaped groove-free region that surrounds the groove-pattern region,
wherein, when the sensor diaphragm is displaced so as to reach a bottom of the curved recess of the first holder, the groove-free region is divided into
a ring-shaped first region with which the sensor diaphragm is in close contact, and
a ring-shaped second region disposed between the inner wall surface of the ring-shaped wall and the ring-shaped first region,
wherein the ring-shaped first region serves as a sealing region and the ring-shaped second region serves as a confinement region so that a pressure transmitting medium that remains in a space adjacent to the inner wall surface of the ring-shaped wall is confined in the confinement region, and
wherein the curved recess extends along the curve to the ring-shaped wall.

2. The pressure sensor chip according to claim 1, wherein the ring-shaped wall is formed integrally with the first holder.

3. The pressure sensor chip according to claim 1, wherein the ring-shaped wall is provided as a component separate from the first holder.

4. The pressure sensor chip according to claim 1, wherein an angle of the inner wall surface of the ring-shaped wall with respect to a joining surface between the ring-shaped wall and a peripheral portion of the sensor diaphragm is greater than or equal to 45°.

5. The pressure sensor chip according to claim 2, wherein an angle of the inner wall surface of the ring-shaped wall with respect to a joining surface between the ring-shaped wall and a peripheral portion of the sensor diaphragm is greater than or equal to 45°.

6. The pressure sensor chip according to claim 3, wherein an angle of the inner wall surface of the ring-shaped wall with respect to a joining surface between the ring-shaped wall and a peripheral portion of the sensor diaphragm is greater than or equal to 45°.

7. The pressure sensor chip of claim 1, wherein when the sensor diaphragm is displaced so as to reach the bottom of the curved recess of the first holder, the ring-shaped second region is formed.

\* \* \* \* \*